March 1, 1932.  A. KÜMMERLE ET AL  1,847,115
DIRECTION INDICATOR FOR CYCLES AND THE LIKE
Filed May 13, 1930
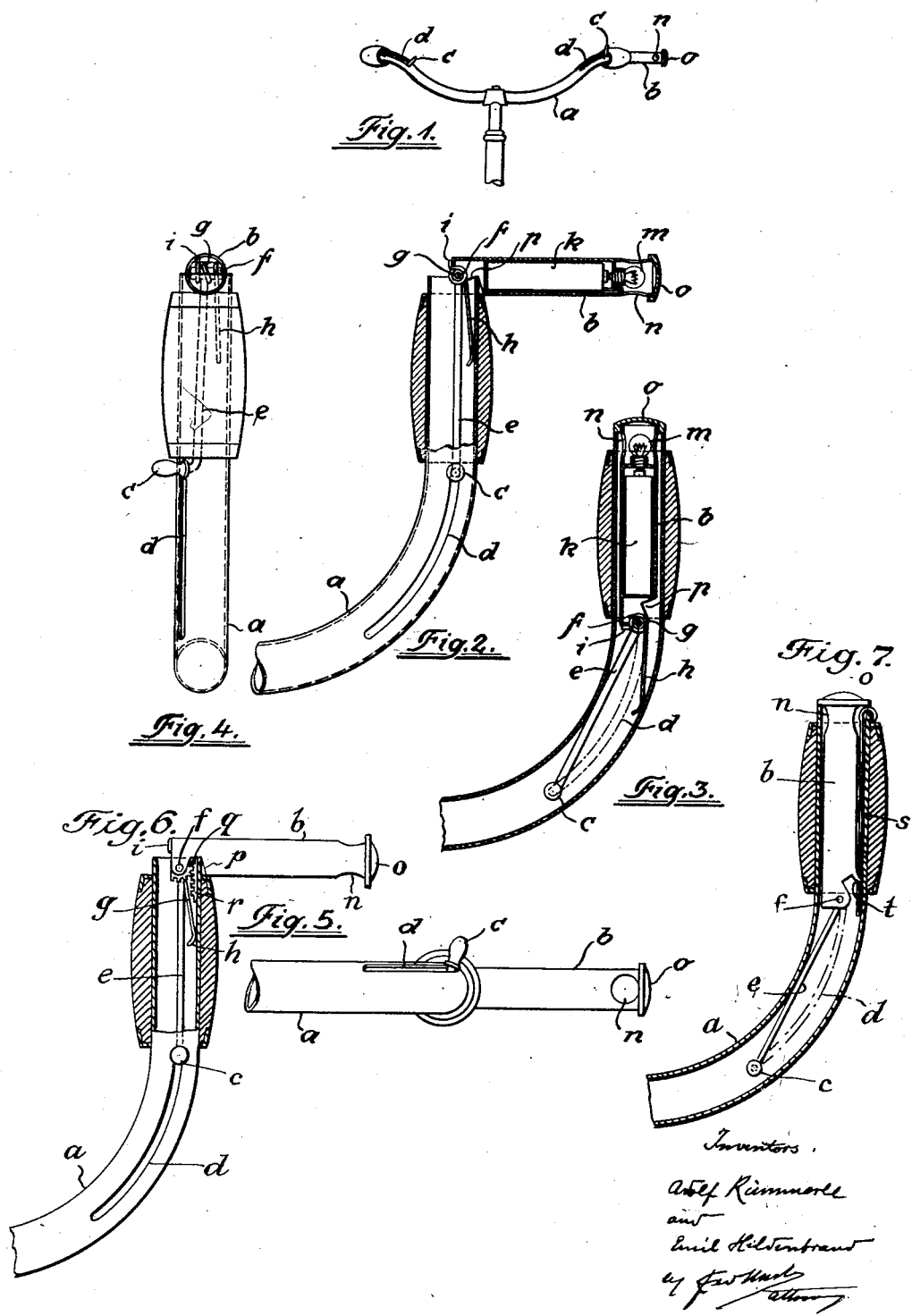

Patented Mar. 1, 1932

1,847,115

UNITED STATES PATENT OFFICE

ADOLF KÜMMERLE AND EMIL HILDENBRAND, OF PFORZHEIM, GERMANY

DIRECTION INDICATOR FOR CYCLES AND THE LIKE

Application filed May 13, 1930, Serial No. 452,063, and in Germany April 13, 1929.

This invention relates to a direction indicator for cycles, motor-cycles and the like, particularly such formed as a torch lamp and slidable out of a tube.

According to this invention such torch lamps are arranged longitudinally displaceable and laterally swivelled in the handle bars of cycles and the like. For pushing out the torch lamps sliding knobs are provided, which are slidably guided in slots in the handle bar and are connected by means of resilient flexible rods on a vertical hinge bolt on the inner end of the torch lamps.

As means for the automatic swinging out of the torch lamps cut out portions provided on the inner ends of the torch lamps are used, which engage, when the torch lamps are pushed out around the end edges of the handle bars, around a spring wound around a hinge bolt on the inner end of the torch lamp, the short end of said spring bearing against the end edge of the torch lamp and the long end on the inside of the wall of the handle bar.

In this manner it is possible to bring the pivoted torch lamp on the rearwardly directed handle bar handles, on the widest part of the cycle, into the laterally directed position suitable for indicating the intended direction of travel and to accommodate the torch lamps in protected position, when not in use.

An embodiment of the invention is illustrated by way of example in the accompanying drawings in which:—

Fig. 1 shows a cycle handle bar in front elevation with direction indicator.

Fig. 2 shows a left hand handle of a handle bar with direction indicator in swung out position in top plan view, partly in section.

Fig. 3 is a similar view to Fig. 2, the direction indicator being in inoperative position.

Fig. 4 is a side view of the handle bar with the direction indicator in inoperative position.

Fig. 5 is a front elevation of the left hand end of a handle bar, the direction indicator being in operative position.

Fig. 6 shows in operative position, in top plan view, partly in section, the left handle of the handle bars with toothed gear swinging out device for the torch lamp.

Fig. 7 shows in inoperative position in top plan view partly in section the left handle of the handle bars with swinging out device composed of a guide for the torch lamp.

$a$ represents the handle of the handle bar. $b$ is an electric torch lamp, $c$ is a knob guided in a slot $d$ in the handle bar $a$ and connected by a resilient flexible rod $e$, similar to a flexible shaft, with a vertical hinge bolt $f$ in the inner end of the torch lamp $b$. A spring $g$ is wound around the hinge bolt $f$, the long end $h$ of the spring $g$ bearing under stress against the inner side of the outer handle bar wall and the short end $i$ on the rear end of the torch lamp. A battery $k$ is provided in the torch lamp and light apertures $n$ behind an incandescent lamp $m$. On the free end of the torch lamp $b$ a cap is arranged, which covers the end aperture of the handle bar $a$, when the torch lamp is in closed position. In the outer side of the rear end of the torch lamp $b$ a cut out portion $p$ with inclined edges is provided.

If the torch lamp $b$ is pushed out of the handle bar $a$ by shifting the knob $c$ in the slot $d$ through the intermediary of the flexible rod $e$, the lamp swings outwardly under the action of the short end $i$ of the spring $g$ with its cut out portion $p$ around the outer end edge of the handle bar $a$. On pulling back the knob $c$, the torch lamp $b$ swings with its cut out portion $p$ again back around the end edge of the handle bar $a$ and is returned under the action of the long end $h$ of the spring $g$ and the inclined edge of the cut out portion $p$ in the handle bar $a$ and then pulled back into same.

The swinging out device for the torch lamp may also consist of a toothed gear $q$ on the rear end of the lamp and a rack $r$ on the inner wall of the handle bar $a$ (Fig. 6), or a guide bar $s$ bent around the outer edge of the handle bar may be arranged on the inner wall of the handle bar, in which guide bar the torch lamp is guided at its rear end by means of an eye $t$.

We claim:—

1. A direction indicator for cycles, motor-cycles and the like comprising in combination with the handle bar a torch light adapted to be pushed out of the handle bar and at the same time to swing outwards laterally on the end of the handle bar.

2. A direction indicator as claimed in claim 1, comprising in combination with the handle bar of a motor-cycle having a slot, an electric torch lamp, a slidable knob engaging in said slot of said handle bar, a resilient flexible rod connected at one end with said knob, and a vertical hinge pin on the inner edge of said torch lamp connected to the other end of said flexible rod.

3. A direction indicator, comprising in combination with the handle bar of a motor-cycle having a slot, an electric torch lamp, a slidable knob guided in said slot of said handle bar, a resilient flexible rod connected at one end to said knob, a hinge pin on the inner end of said torch lamp connected with the other end of said rod, a spring wound around said hinge pin bearing with its short end against the inner end of said torch lamp and with its longer end against the outer inner wall of said handle bar, said torch lamp having a cut out portion on its inner end directed towards the outside.

4. A direction indicator as claimed in claim 1, comprising in combination with the handle bar of a motor-cycle, having a slot, an electric torch lamp, a slidable knob guided in said slot of said handle bar, a resilient flexible rod connected at one end with said slidable rod, a vertical hinge pin on the inner end of said torch lamp connected with the other end of said rod, and stops on the inner end of said torch lamp and on the outer end of said handle bar, said stops adapted to mutually engage the one with the other.

5. A direction indicator as claimed in claim 1, comprising in combination with the handle bar of a motor-cycle having a slot, an electric torch lamp, a slidable knob guided in said slot of said handle bar, a resilient flexible rod connected at one end with said slidable rod, a vertical hinge pin on the inner end of said torch lamp connected with the other end of said rod, and toothed portions on the inner end of said torch lamp and on the outer end of said handle bar, said toothed portions adapted to mutually engage the one with the other.

6. A direction indicator as claimed in claim 1, comprising in combination with the handle bar of a motor-cycle, having a slot, an electric torch lamp, a slidable knob guided in said slot of said handle bar, a resilient flexible rod connected at one end with said slidable knob, a vertical hinge pin on the inner end of said torch lamp connected with the other end of said flexible rod, a guide on the outer longitudinal side of said torch lamp, a counter guide on the inner wall of said handle bar adapted to engage with the guides of said torch lamp, and stops adapted to limit the guiding movement of said guides.

In testimony whereof we affix our signatures.

ADOLF KÜMMERLE.
EMIL HILDENBRAND.